July 8, 1947.  C. W. WILLIAMS  2,423,539
VIEWING VISOR
Filed April 19, 1945
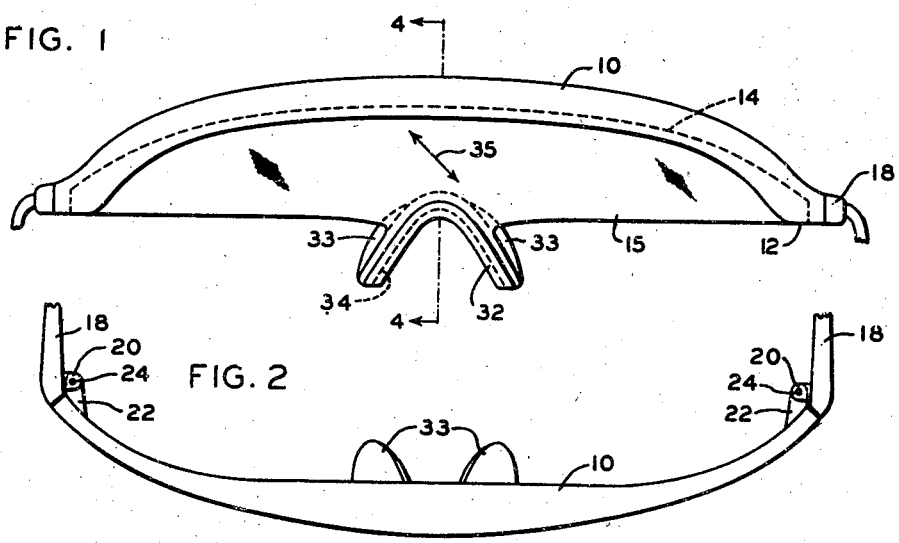
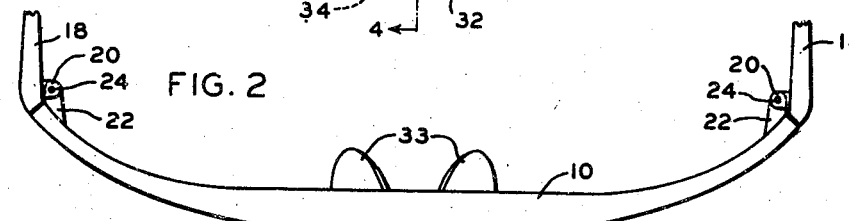
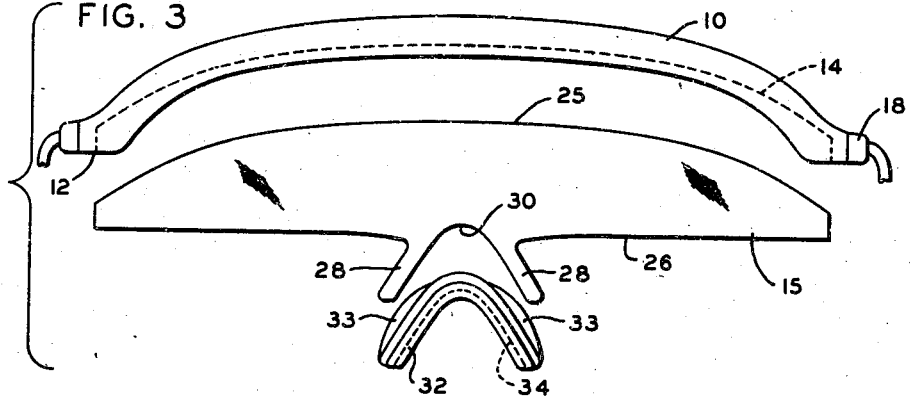
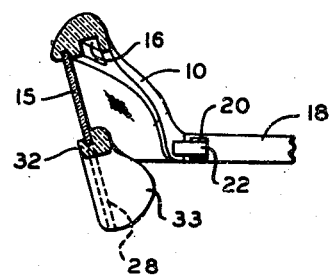
INVENTOR.
Charles H. Williams
BY Donald L. Brown
Attorney Patented July 8, 1947

2,423,539

UNITED STATES PATENT OFFICE 2,423,539

VIEWING VISOR

Charles W. Williams, Cambridge, Mass., assignor to Polaroid Corporation, Cambridge, Mass., a corporation of Delaware Application April 19, 1945, Serial No. 589,113

6 Claims. (Cl. 88—41)

This invention relates to ophthalmic devices, and more particularly to a new and improved viewing visor.

It is one object of the invention to provide a viewing visor of novel, light-weight construction adapted to cover only an upper portion of the eyes of the wearer and to permit free vision therebelow with a minimum of inconvenience.

Another object is to provide such a viewing visor comprising a bar element adapted to extend across the face and above the eyes of the wearer thereof and having its ends curved downwardly to positions opposite the upper portion of the eyes of said wearer, and comprising a lens of selectively light-absorbing, sheet plastic material secured to said bar and having its lower edge substantially horizontal and substantially coplanar with the ends of said bar.

Further objects are to provide a visor as outlined above wherein said lens include a pair of downwardly extending, diverging tab portions defining a nose recess and adapted to rest on the nose of the wearer of said goggle, and to provide supplemental nose pad means secured to said tab portions of said lens to increase the comfort of said visor.

A still further object is to provide a lens for a visor of the above characteristics comprising an initially flat sheet of transparent plastic material, and including downwardly extending tab portions defining a nose recess and providing means adapted to engage the nose of the wearer thereof.

Additional objects and advantages will in part appear and in part be pointed out in the course of the following detailed description of one or more embodiments of the invention, which are given as non-limiting examples, in connection with the accompanying drawings, in which:

Figure 1 is a front view of a viewing visor embodying a form of the invention;

Figure 2 is a plan view of the visor shown in Fig. 1;

Figure 3 is an exploded front view of the visor shown in Figs. 1 and 2; and

Figure 4 is a view in vertical section taken substantially on the line 4—4 in Fig. 1.

Bar element 10 in the drawings is preferably formed as by molding from any suitable organic plastic such for example as cellulose acetate, and it is designed to generally extend across the face and above the eyes of a wearer of the device. Bar 10 is preferably curved rearwardly in order to conform to the curvature of the face of a wearer and is also curved downwardly adjacent its ends to such an extent that the lower portions 12 of said bar ends lie in a horizontal plane passing through or somewhat above the center of the eyes of a wearer. Bar 10 is provided with a longitudinal groove 14 in the under surface thereof adapted to receive the upper edge of lens 15, and said under surface may also be cut out as at 16 to decrease the weight of the bar. Bar 10 is provided with any suitable temple means 18 hinged thereto in any desired way as by means of forks 20 carried by each of said temple means and engaging one of rearwardly projecting lugs 22 on bar 10 and pivoted thereon by means of hinge pin 24. It is to be understood that the invention is not limited to this particular hinge construction but may utilize any of a variety of equivalent hinge means.

In accordance with the invention, lens 15 preferably comprises an initially flat sheet of any suitable transparent plastic material and is essentially shaped to fill in the area defined by the downward curvature of bar 15 and with its upper edge 25 curved to engage groove 14 in bar 10 and preferably cemented therein by any suitable adhesive means. Lower edge 26 of lens 10 is preferably substantially horizontal and coplanar with the lower surface 12 of the ends of bar 10, except adjacent the middle thereof, where it is provided with a pair of downwardly extending tab portions 28 which preferably diverge and define therebetween a nose-receiving recess 30. In a preferred construction, lens 15 may be cut as a unit with tabs 28 from a single plastic sheet, and if desired it may be used without additional nose pad means, in which case the inner edges of tabs 28 will engage the nose of the wearer and thereby support the device in position. Preferably, however, the invention contemplates the provision of additional nose pad means. An example of such means is shown in the drawings as comprising a yoke element 32 provided with rearwardly extending nose-engaging pads 33 and provided on its outer surface with a groove 34 adapted to receive the inner edges of tabs 28. Preferably at least the rear face of groove 34 is of substantially the same area as tabs 28 and said tabs are preferably secured within groove 34 by any suitable adhesive means. For example, both lens 15 and yoke 32 may be formed from cellulose acetate, in which case they may be adhered together by applying to the junction therebetween a small amount of any suitable solvent for cellulose acetate such for example as acetone. It will be noted that when yoke 32 is secured in position on lens 15, the top thereof will lie in substantially the same plane as lens edge 25 and the ends of bar 10. It will also be noted that lens 15 is widest horizontally along its lower edge 26 and widest vertically adjacent its middle or nose-engaging portion.

Some of the advantages of the above-described construction should be readily apparent. Since lens 15 will normally overlie only an upper portion of the eyes of the wearer, the latter may by raising his head slightly readily look out under the device but by lowering his head slightly he may with equal ease look through lens 15. A particularly useful application for the device of the invention is as a viewing visor for use in a system of polarized vehicle headlighting. In this case lens 15 will comprise sheet polarizing material and the transmission axis of lens 15 will preferably be arranged at an angle of 45° to the horizontal, as indicated by arrow 35, in accordance with the system disclosed in Patent No. 2,087,795. The wearer of such a device may then look through lens 15 and thus block out polarized light from the headlights of an approaching vehicle but will have completely unobstructed vision under lens 15 when no vehicle is approaching. It is to be understood however that the present invention is not limited to the use of polarizing material in lens 15 but may use any of a variety of other transparent organic plastics, preferably selecting light-absorbing, such for example as cellulose acetate having any selectively light-absorbing agent incorporated therein. Considerable modification is also possible in the general shape and construction of other elements of the invention, particularly the nose pad means. For example, an embodiment of the invention particularly adapted to wearing in conjunction with spectacles may be provided by forming yoke 32 without additional nose engaging pads 33. In this event the underside of yoke 32 will thus provide a broad bearing surface for engagement with the nose of the wearer, but the absence of nose pads 33 will permit the device to be worn closer to a pair of spectacles on the nose of the wearer than would otherwise be the case. Numerous other modifications within the scope of the invention will doubtless be apparent to those skilled in the art.

Since certain changes may be made in the above product and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. An ophthalmic device comprising, in combination, a bar element adapted to extend generally across the face and above the eyes of the wearer of said device, temple means for holding said device in position on said wearer, lens means comprising a sheet of transparent, selectively light-absorbing, organic plastic material, means for securing said lens to said bar, the lower edge of said lens sheet substantially coinciding with a horizontal plane through the optical axes of said wearer, said sheet having a pair of tab portions adjacent the middle of the lower edge thereof, said tab portions extending downwardly below the lower edge of said lens in said horizontal plane, and said tab portions defining a nose recess therebetween, nose-engaging means fitting within said recess, and means for securing said nose-engaging means to said tab portions.

2. An ophthalmic device comprising, in combination, a bar element adapted to extend generally across the face and above the eyes of the wearer of said device, temple means for holding said device in position on said wearer, lens means comprising an initially flat sheet of transparent, selectively light-absorbing, organic plastic material, means for securing said lens to said bar, the lower edge of said lens sheet substantially coinciding with a horizontal plane through the optical axes of said wearer, said sheet having a pair of tab portions adjacent the middle of the lower edge thereof, said tab portions extending downwardly below the lower edge of said lens in said horizontal plane, and said tab portions defining a nose recess therebetween, nose-engaging means fitting within said recess, said nose-engaging means comprising a yoke element provided on its outside with a groove for receiving the edge of said tab portions of said lens, and means for retaining said tab portions within said groove.

3. An ophthalmic device comprising, in combination, a bar element of organic plastic material having a longitudinal groove in the under surface thereof and adapted to extend substantially across the face and above the eyes of the wearer of said device, temple means hingedly connected to said bar element for holding said device in position on said wearer, said bar element being curved downwardly adjacent the ends thereof to such a degree that said ends lie in a horizontal plane passing substantially through the optical axes of said wearer, lens means comprising a sheet of transparent, selectively light-absorbing, organic plastic material, the upper edge of said lens substantially conforming in outline with the inner surface of the groove in said bar element, means for securing said lens within said groove, the lower edge of said lens sheet substantially coinciding with said plane through said bar ends except adjacent the middle thereof, said sheet having a pair of tab portions extending downwardly below the lower edge of said lens in said horizontal plane, and said tab portions defining a nose recess therebetween, nose-engaging means fitting within said recess, and means for securing said nose-engaging means to said tab portions.

4. An ophthalmic device comprising, in combination, a bar element of organic plastic material adapted to extend generally across the face and above the eyes of the wearer of said device, temple means hingedly connected to said bar element for holding said device in position on said wearer, said bar element being curved about a substantially vertical axis to conform to the head of said wearer, said bar element being curved downwardly adjacent the ends thereof to such a degree that said ends lie in a horizontal plane passing through the upper portion of the eyes of said wearer, lens means comprising an initially flat sheet of transparent, selectively light-absorbing, organic plastic material, the upper edge of said lens substantially conforming in outline with the lower surface of said bar element, means for securing said lens to said bar, the lower edge of said lens substantially coinciding with said plane through said bar ends except adjacent the middle thereof, said lens having a pair of downwardly extending tab portions defining a nose-engaging recess therebetween, and nose pad means comprising a yoke element provided with nose-engaging pad portions, said yoke element fitting within said nose-engaging recess in said lens, the outside of said yoke element being provided with a groove, the edges of said tab portions engaging in said groove.

5. An ophthalmic device comprising, in combination, a bar element of organic plastic material adapted to extend generally across the face and above the eyes of the wearer of said device, temple means hingedly connected to said bar element for holding said device in position on said wearer, said bar element being curved about a substantially vertical axis to conform to the head of said wearer, said bar element being curved downwardly adjacent the ends thereof to such a degree that said ends lie in a horizontal plane passing through the upper portion of the eyes of said wearer, said bar element being provided with a longitudinal groove in the under surface thereof, lens means comprising an initially flat sheet of transparent, selectively light-absorbing, organic plastic material, the upper edge of said lens substantially conforming in outline with the lower surface of said bar element and engaging in said groove in said bar, the lower edge of said lens substantially coinciding with said plane through said bar ends except adjacent the middle thereof, said lens having a pair of downwardly extending, diverging tab portions defining a nose-engaging recess therebetween, and nose pad means comprising a yoke element provided with nose-engaging pad portions, said yoke element fitting within said nose-engaging recess in said lens, the outside of said yoke element being provided with a groove, the edges of said tab portions engaging in said groove.

6. An ophthalmic device comprising, in combination, a bar element of organic plastic material adapted to extend generally across the face and above the eyes of the wearer of said device, temple means hingedly connected to said bar element for holding said device in position on said wearer, said bar element being curved downwardly adjacent the ends thereof to such a degree that said ends lie in a horizontal plane substantially below the rest of said bar, lens means comprising an initially flat sheet of transparent, selectively light-absorbing, organic plastic material, the upper edge of said lens substantially conforming in outline with the lower surface of said bar element, means for securing said lens to said bar, the lower edge of said lens substantially coinciding with said plane through said bar ends except adjacent the middle thereof, said lens having a pair of downwardly extending tab portions defining a nose-engaging recess therebetween, and nose pad means comprising a yoke element provided with nose-engaging pad portions, said yoke element fitting within said nose-engaging recess in said lens, the outside of said yoke element being provided with a groove, the edges of said tab portions engaging in said groove, the top of said yoke element lying in substantially the same horizontal plane as said bar ends.

CHARLES W. WILLIAMS.

REFERENCES CITED

The following references are of record in the file of this patent:

UNITED STATES PATENTS

| Number | Name | Date |
| --- | --- | --- |
| 2,368,750 | DuBois | Feb. 6, 1945 |
| 2,187,810 | Rentz | Jan. 23, 1940 |
| 2,337,617 | Miller, Jr. | Dec. 28, 1943 |
| 1,249,908 | Day | Dec. 11, 1917 |
| 1,899,905 | Uhlemann | Feb. 28, 1933 |
| 2,334,446 | Serrell | Nov. 16, 1943 |
| 2,257,812 | Pomeranz | Oct. 7, 1941 |
| 1,723,474 | Esleck | Aug. 6, 1929 |
| 1,503,868 | Weed | Aug. 5, 1924 |
| 1,624,337 | Halikman | Apr. 12, 1927 |
| 1,628,586 | Flodin | May 10, 1927 |
| 2,192,092 | Miller | Feb. 27, 1940 |